United States Patent
Maeda

(10) Patent No.: US 11,795,267 B2
(45) Date of Patent: Oct. 24, 2023

(54) AQUEOUS URETHANE RESIN COMPOSITION AND SYNTHETIC LEATHER

(71) Applicant: DIC Corporation, Tokyo (JP)

(72) Inventor: Ryo Maeda, Osaka (JP)

(73) Assignee: DIC CORPORATION, Tokyo (JP)

( * ) Notice: Subject to any disclaimer, the term of this patent is extended or adjusted under 35 U.S.C. 154(b) by 937 days.

(21) Appl. No.: 16/347,061

(22) PCT Filed: Oct. 26, 2017

(86) PCT No.: PCT/JP2017/038610
§ 371 (c)(1),
(2) Date: May 2, 2019

(87) PCT Pub. No.: WO2018/110105
PCT Pub. Date: Jun. 21, 2018

(65) Prior Publication Data
US 2020/0071452 A1    Mar. 5, 2020

(30) Foreign Application Priority Data

Dec. 12, 2016 (JP) ................. 2016-240299

(51) Int. Cl.
| | |
|---|---|
| *C08G 18/61* | (2006.01) |
| *C08G 18/76* | (2006.01) |
| *C08G 18/32* | (2006.01) |
| *C08G 18/34* | (2006.01) |
| *C08G 18/40* | (2006.01) |
| *C08G 18/42* | (2006.01) |
| *C08G 18/44* | (2006.01) |
| *C08G 18/48* | (2006.01) |
| *C08G 18/66* | (2006.01) |

(52) U.S. Cl.
CPC ..... *C08G 18/7614* (2013.01); *C08G 18/3206* (2013.01); *C08G 18/348* (2013.01); *C08G 18/4018* (2013.01); *C08G 18/4238* (2013.01); *C08G 18/44* (2013.01); *C08G 18/4829* (2013.01); *C08G 18/4854* (2013.01); *C08G 18/6659* (2013.01); *C08G 18/6692* (2013.01); *C08G 18/7671* (2013.01)

(58) Field of Classification Search
CPC ......... D06N 3/145; D06N 3/128; C08G 18/61
See application file for complete search history.

(56) References Cited

U.S. PATENT DOCUMENTS

| | | | |
|---|---|---|---|
| 7,122,596 B2 | 10/2006 | Kato et al. | |
| 2002/0018892 A1* | 2/2002 | Satake | ............... C08G 18/6659 |
| | | | 428/355 R |
| 2014/0235786 A1 | 8/2014 | Goto et al. | |
| 2016/0208432 A1* | 7/2016 | Tetsui | ................... D06N 3/146 |

FOREIGN PATENT DOCUMENTS

| | | | | |
|---|---|---|---|---|
| CN | 101851864 B | 10/2010 | | |
| EP | 3029110 A1 | 6/2016 | | |
| EP | 3101172 A1 | 12/2016 | | |
| JP | 02112486 A * | 4/1990 | ............. | C08G 18/61 |
| JP | 2007-119749 A | 5/2007 | | |
| JP | 2015-101625 A | 6/2015 | | |
| JP | 2016-084463 A | 5/2016 | | |
| KR | 10-2014-0026391 A | 3/2014 | | |
| TW | 591093 B | 6/2004 | | |
| WO | 2012/172936 A1 | 12/2012 | | |
| WO | 2013/176257 A1 | 11/2013 | | |
| WO | 2015/012117 A1 | 1/2015 | | |
| WO | 2015/033732 A1 | 3/2015 | | |
| WO | WO-2015059924 A1 * | 4/2015 | ............. | B32B 27/12 |
| WO | 2016/063761 A1 | 4/2016 | | |
| WO | 2016/140025 A1 | 9/2016 | | |

OTHER PUBLICATIONS

Espacenet Translation of JP 2007119749 (Year: 2022).*
Espacenet Translation of JP 2009275173 (Year: 2022).*
International Search Report issued in corresponding International Patent Application No. PCT/JP2017/038610, dated Dec. 19, 2017, with English Translation.

* cited by examiner

*Primary Examiner* — Michael M Dollinger
(74) *Attorney, Agent, or Firm* — McDermott Will & Emery LLP

(57) ABSTRACT

An aqueous urethane resin composition includes a urethane resin and an aqueous medium, wherein the urethane resin is a reaction product of a polyol comprising an anionic group-containing polyol and an aromatic polyisocyanate, and has an anionic group concentration of 0.35 mmol/g or less. A synthetic leather is also provided. The synthetic leather includes a laminate including at least a base fabric, a bonding layer, and a skin layer, wherein the bonding layer is made from the aqueous urethane resin composition. A task to be achieved is to provide an aqueous urethane resin composition exhibiting excellent peel strength, hydrolytic resistance, and light resistance.

5 Claims, No Drawings

AQUEOUS URETHANE RESIN COMPOSITION AND SYNTHETIC LEATHER

CROSS REFERENCE

This patent application is the U.S. National Phase under 35 U.S.C. § 371 of International Application No. PCT/JP2017/038610, filed on Oct. 26, 2017, which claims the benefit of Japanese Patent Application No. 2016-240299, filed on Dec. 12, 2016, the entire contents of each are hereby incorporated by reference.

TECHNICAL FIELD

The present invention relates to an aqueous urethane resin composition having a urethane resin dispersed in an aqueous medium.

BACKGROUND ART

Polyurethane resins have excellent mechanical strength and texture, and therefore are widely used in the production of synthetic leather (including artificial leather). In this application, N,N-dimethylformamide (DMF)-containing solvent-based urethane resins are mainly used. However, no use of DMF is required for urethane resins used to form layers in synthetic leather under background circumstances such as regulations on DMF in Europe, strengthening of VOC emissions control in China and Taiwan, and major apparel manufacturers' regulations on DMF.

For meeting the environmental demands, an aqueous urethane resin composition, for example, having a urethane resin dispersed in water is being extensively studied (see, for example, PTL 1). As seen in the invention described in PTL 1, with respect to the urethane resin used for a skin layer of synthetic leather, the replacement of the urethane resin of a solvent system by a urethane resin of an aqueous system is gradually progressing in the market. However, with respect to the urethane resin used for an intermediate layer of synthetic leather, the replacement by a urethane resin of an aqueous system has not been in progress. The reason for this mainly resides in that an aqueous urethane resin has an unsatisfactory peel strength, as compared to a solvent urethane resin.

CITATION LIST

Patent Literature

PTL 1: JP-A-2007-119749

SUMMARY OF INVENTION

Technical Problem

A task to be achieved by the present invention is to provide an aqueous urethane resin composition exhibiting excellent peel strength, hydrolytic resistance, and light resistance.

Solution to Problem

According to the invention, there is provided an aqueous urethane resin composition including: a urethane resin (A); and an aqueous medium (B), the urethane resin (A) being a reaction product of a polyol (a1) comprising an anionic group-containing polyol (a1-1) and an aromatic polyisocyanate (a2), the urethane resin (A) having an anionic group concentration of 0.35 mmol/g or less.

Further, according to the invention, there is provided a synthetic leather including a laminate including at least a base fabric (i), a bonding layer (ii), and a skin layer (iii), wherein the bonding layer (ii) is made from the aqueous urethane resin composition according to any one of claims 1 to 4.

Advantageous Effects of Invention

The aqueous urethane resin composition of the invention exhibits excellent peel strength, hydrolytic resistance, and light resistance.

Therefore, the aqueous urethane resin composition of the invention can be advantageously used in the production of a synthetic leather, and can be particularly advantageously used as a resin for forming an intermediate layer of a synthetic leather. Thus, the aqueous urethane resin composition can be used in the applications that need high durability, such as interior automotive trims, furniture, and sports shoes, in which the replacement of the urethane resin of a solvent system by a urethane resin of an aqueous system has been considered difficult.

Description of Embodiments

The aqueous urethane resin composition of the invention contains a urethane resin (A) and an aqueous medium (B), wherein the urethane resin (A) is a reaction product of a polyol (a1) comprising an anionic group-containing polyol (a1-1), and an aromatic polyisocyanate (a2), and has an anionic group concentration of 0.35 mmol/g or less.

The anionic group-containing polyol (a1-1) is a raw material for obtaining an anionic urethane resin, and, for example, a polyol having a carboxyl group, such as 2,2-dimethylolpropionic acid, 2,2-dimethylolbutanoic acid, 2,2-dimethylolbutyric acid, or 2,2-valeric acid; a polyol having a sulfonyl group, such as 3,4-dimethylolbutanesulfonic acid or 3,6-dimethylol-2-toluenesulfonic acid, or the like can be used. These compounds may be used individually or in combination.

From the viewpoint of facilitating adjustment of the anionic group concentration of the polyurethane resin (A) to that in the range described in the invention to achieve further excellent hydrolytic resistance, the content of the polyol (a1-1) in the polyol (a1) is preferably in the range of 0.05 to 10% by mass, more preferably in the range of 0.1 to 6.2% by mass, further preferably in the range of 0.5 to 3% by mass, especially preferably in the range of 1 to 2.7% by mass.

With respect to the polyol other than the polyol (a1-1), which can be used as the polyol (a1), for example, polyether polyol, polyester polyol, polycarbonate polyol, dimer diol, acrylic polyol, polybutadiene polyol, or the like can be used. These polyols may be used individually or in combination. Of these, from the viewpoint of further improving the hydrolytic resistance, polyether polyol and/or polycarbonate polyol is preferably used.

From the viewpoint of obtaining further excellent peel strength, mechanical strength of a film, and hydrolytic resistance, the number average molecular weight of the polyol (a1) is preferably in the range of 500 to 10,000, more preferably in the range of 800 to 5,000. The number average molecular weight of the polyol (a1) indicates a value measured by a gel permeation column chromatography (GPC) method.

In the polyol, if necessary, a chain extender (having no carboxyl group) may be used. As the chain extender, for example, a chain extender having a hydroxyl group, a chain extender having an amino group, or the like can be used. These may be used individually or in combination. Of these, from the viewpoint of obtaining further excellent light resistance, a chain extender having a hydroxyl group is preferably used.

With respect to the chain extender having a hydroxyl group, for example, an aliphatic polyol compound, such as ethylene glycol, diethylene glycol, triethylene glycol, propylene glycol, 1,3-propanediol, 1,3-butanediol, 1,4-butanediol, hexamethylene glycol, saccharose, methylene glycol, glycerol, or sorbitol; an aromatic polyol compound, such as bisphenol A, 4,4'-dihydroxydiphenyl, 4,4'-dihydroxydiphenyl ether, 4,4'-dihydroxydiphenyl sulfone, hydrogenated bisphenol A, or hydroquinone; water, or the like can be used. These chain extenders may be used individually or in combination. Of these, from the viewpoint of readily suppressing discoloration to obtain further excellent light resistance, an aliphatic polyol compound is preferably used.

With respect to the chain extender having an amino group, for example, ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine, triethylenetetramine, or the like can be used. These chain extenders may be used individually or in combination.

When the chain extender (a3) is used, from the viewpoint of further improving the durability of a film, the amount of the chain extender (a3) used is preferably in the range of 0.5 to 40% by mass, more preferably in the range of 1 to 20% by mass, based on the total mass of the raw materials constituting the urethane resin (A).

The aromatic polyisocyanate (a2) has strong intermolecular force and is an essential component for obtaining excellent peel strength due to the packing effect. With respect to the aromatic polyisocyanate (a2), for example, phenylene diisocyanate, toluene diisocyanate, diphenylmethane diisocyanate, naphthalene diisocyanate, polymethylene polyphenyl polyisocyanate, carbodiimidated diphenylmethane polyisocyanate, or the like can be used. These aromatic polyisocyanates may be used individually or in combination. Of these, from the viewpoint of having appropriately weak crystalline properties such that further excellent peel strength can be achieved, toluene diisocyanate is preferably used.

When toluene diisocyanate is used as the aromatic polyisocyanate (a2), from the viewpoint of obtaining further excellent peel strength, the amount of the toluene diisocyanate used is preferably 50% by mass or more, more preferably 70% by mass or more, based on the mass of the aromatic polyisocyanate (a2).

In the aromatic polyisocyanate (a2), an aliphatic or alicyclic polyisocyanate may be used in such an amount that the effects of the invention are not sacrificed.

With respect to the aliphatic or alicyclic polyisocyanate, for example, an aliphatic or alicyclic polyisocyanate, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, or norbornene diisocyanate, or the like can be used. These polyisocyanates may be used individually or in combination.

As a method for producing the urethane resin (A), for example, there can be mentioned a method in which the polyol (a1), the aromatic polyisocyanate (a2), and, if necessary, the chain extender (a3) are charged together at one time and subjected to reaction. With respect to the reaction, for example, there can be mentioned a method in which the reaction is conducted at a temperature of 50 to 100° C. for 3 to 10 hours.

The molar ratio of the isocyanate group of the aromatic polyisocyanate (a2) to the total of the hydroxyl group of the polyol (a1) and the hydroxyl group and/or the amino group of the chain extender which is optionally used [(isocyanate group)/(total of the hydroxyl group and the amino group)] is preferably in the range of 0.8 to 1.2, more preferably in the range of 0.9 to 1.1.

When producing the urethane resin (A), it is preferred to deactivate the isocyanate group remaining in the urethane resin (A). When deactivating the isocyanate group, an alcohol having a hydroxyl group, such as methanol, is preferably used. When the alcohol is used, the amount of the alcohol used is preferably in the range of 0.001 to 10 parts by mass, relative to 100 parts by mass of the urethane resin (A).

Further, when producing the urethane resin (A), an organic solvent may be used. As the organic solvent, for example, a ketone compound, such as acetone or methyl ethyl ketone; an ether compound, such as tetrahydrofuran or dioxane; an acetate compound, such as ethyl acetate or butyl acetate; a nitrile compound, such as acetonitrile; an amide compound, such as dimethylformamide or N-methylpyrrolidone, or the like can be used. These organic solvents may be used individually or in combination. The organic solvent is preferably removed by a distillation method or the like when obtaining the aqueous urethane resin composition.

For obtaining excellent hydrolytic resistance, it is necessary that the urethane resin (A) obtained by the above-mentioned method have an anionic group concentration of 0.35 mmol/g or less. When the anionic group concentration of the urethane resin (A) is in this range, a lowering of the hydrolytic resistance due to the hydrophilic group can be prevented while maintaining the dispersibility of the urethane resin (A) in water and the peel strength. From the viewpoint of obtaining further excellent hydrolytic resistance, the anionic group concentration of the urethane resin (A) is preferably 0.25 mmol/g or less, more preferably in the range of 0.05 to 0.22 mmol/g. The anionic group concentration of the urethane resin (A) indicates a value obtained by dividing the molar number of the anionic group derived from the anionic group-containing polyol (a1-1) by the total mass of the raw materials constituting the urethane resin (A).

Further, from the viewpoint of obtaining further excellent peel strength, the urethane resin (A) preferably has an aromatic ring concentration in the range of 0.1 to 2.5 mol/kg, more preferably in the range of 0.3 to 2.0 mol/kg. In the calculation, as the molecular weight of an aromatic ring, the molecular weight of benzene or naphthalene having no substituent is used.

From the viewpoint of obtaining further excellent peel strength, the urethane resin (A) preferably has a weight average molecular weight in the range of 2,000 to 150,000, more preferably in the range of 4,000 to 100,000, further preferably in the range of 6,000 to 70,000, especially preferably in the range of 13,000 to 70,000. The weight average molecular weight of the urethane resin (A) indicates a value obtained by conducting the measurement similar to that for the number average molecular weight of the polyol (a1).

With respect to the aqueous medium (B), for example, water, an organic solvent miscible with water, a mixture thereof, or the like can be used. As the organic solvent miscible with water, for example, an alcohol solvent, such as methanol, ethanol, or n- or iso-propanol; a ketone solvent, such as acetone or methyl ethyl ketone; a polyalkylene glycol solvent, such as ethylene glycol, diethylene glycol, or propylene glycol; an alkyl ether solvent, such as polyalkylene glycol; a lactam solvent, such as N-methyl-2-pyrrolidone, or the like can be used. These aqueous media may be used individually or in combination. Of these, from the viewpoint of the safety and the reduction of a load on the environment, only water or a mixture of water and an organic solvent miscible with water is preferably used, and only water is more preferred. From the viewpoint of the workability, application properties, and storage stability, the content of the aqueous medium (B) in the aqueous urethane resin composition is preferably in the range of 20 to 90% by mass, more preferably in the range of 40 to 80% by mass.

The aqueous urethane resin composition used in the invention contains the urethane resin (A) and the aqueous medium (B) as essential components, but may contain another additive if necessary.

With respect to the another additive, for example, a urethane-forming reaction catalyst, a neutralizing agent, a crosslinking agent, a silane coupling agent, a thickener, a filler, a thixotropic agent, a tackifier, a wax, a heat stabilizer, a light stabilizer, a fluorescent brightener, a foaming agent, a pigment, a dye, a conductivity imparting agent, an antistatic agent, a moisture permeability improving agent, a water repellent agent, an oil repellent agent, a blowing agent, a flame retardant, a water absorbent, a moisture absorbent, a deodorant, a foam stabilizer, an anti-blocking agent, a hydrolysis preventive agent, or the like can be used. These additives may be used individually or in combination.

As described above, the aqueous urethane resin composition of the invention exhibits excellent peel strength, hydrolytic resistance, and light resistance. Therefore, the aqueous urethane resin composition of the invention can be advantageously used in the production of a synthetic leather, and can be particularly advantageously used as a resin for forming an intermediate layer of a synthetic leather. Thus, the aqueous urethane resin composition can be used in the applications that need high durability, such as interior automotive trims, furniture, and sports shoes, in which the replacement of the urethane resin of a solvent system by a urethane resin of an aqueous system has been considered difficult.

Next, a synthetic leather using the aqueous urethane resin composition of the invention in the bonding layer is described below.

The synthetic leather has at least a base fabric (i), a bonding layer (ii), and a skin layer (iii), and, specifically, for example, there can be mentioned the following constructions:

(1) a base fabric (i), a bonding layer (ii), and a skin layer (iii);

(2) a base fabric (i), a bonding layer (ii), an intermediate layer, and a skin layer (iii);

(3) a base fabric (i), a wet porous layer, a bonding layer (ii), and a skin layer (iii); and (4) a base fabric (i), a wet porous layer, a bonding layer (ii), an intermediate layer, and a skin layer (iii).

With respect to the base fabric, for example, nonwoven fabric, woven fabric, or knitted fabric, each made from a polyester fiber, a polyethylene fiber, a nylon fiber, an acrylic fiber, a polyurethane fiber, an acetate fiber, a rayon fiber, a polylactate fiber, cotton, linen, silk, wool, a glass fiber, a carbon fiber, or a mixed fiber thereof, or the like can be used.

With respect to the wet porous layer, one which is formed by a known wet film-forming method using a solvent urethane resin composition can be used.

As a material constituting the intermediate layer and skin layer (iii), for example, a known aqueous urethane resin, a solvent urethane resin, a solventless urethane resin, an aqueous acrylic resin, a silicone resin, a polypropylene resin, a polyester resin, or the like can be used. These resins may be used individually or in combination.

Next, a method for producing a synthetic leather having the construction (1) is described below.

With respect to the method for producing the synthetic leather, for example, there can be mentioned a method in which a resin for forming a skin layer is applied onto a release-treated substrate and dried to obtain a skin layer (iii), and then the aqueous urethane resin composition of the invention is applied onto the skin layer (iii) and dried to form a bonding layer (ii), and the formed bonding layer is laminated on a base fabric (i). Further, there can be mentioned a method in which the aqueous urethane resin composition of the invention is applied onto the skin layer (iii), and the resultant layer is laminated on a base fabric (i) and then dried to form a bonding layer (ii).

As a method for applying the aqueous urethane resin composition of the invention, for example, there can be mentioned a method using an applicator, a roll coater, a spray coater, a T-die coater, a knife coater, a comma coater, or the like.

As a method for drying the aqueous urethane resin composition, for example, there can be mentioned a method of performing drying at 40 to 130° C. for 1 to 10 minutes. The thickness of the obtained intermediate layer (ii) is appropriately selected according to the use of the synthetic leather, but, is, for example, in the range of 0.5 to 100 μm.

The synthetic leather is produced and then, if necessary, may be subjected to aging, for example, at 30 to 100° C. for 1 to 10 days.

EXAMPLES

Example 1

<Preparation of an Aqueous Urethane Resin Composition>

Into a four-neck flask equipped with a stirrer, a reflux condenser, a thermometer, and a nitrogen gas introducing pipe were charged 500 parts by mass of polytetramethylene glycol (number average molecular weight: 1,000; hereinafter, abbreviated to "PTMG1000"), 15 parts by mass of 2,2-dimethylolpropionic acid (hereinafter, abbreviated to "DMPA"), and 428 parts by mass of methyl ethyl ketone under a nitrogen gas flow, and they were uniformly mixed with each other, and then 117 parts by mass of toluene diisocyanate (hereinafter, abbreviated to "TDI") was added, and then 0.1 parts by mass of dibutyltin dilaurate was added and the resultant mixture was subjected to reaction at 70° C. for about 4 hours. Subsequently, 11 parts by mass of 1,3-butanediol (hereinafter, abbreviated to "1,3-BG") was added and the resultant mixture was subjected to reaction at 70° C. for about one hour so as to complete the reaction, obtaining a methyl ethyl ketone solution of a urethane polymer. Then, 10 parts by mass of N,N-dimethylethanolamine was added to the methyl ethyl ketone solution of the urethane polymer obtained by the above-mentioned method to neutralize the carboxyl group in the urethane polymer, and then 964 parts by mass of ion-exchanged water was added and then methyl ethyl ketone was distilled off under a reduced pressure to obtain an aqueous urethane resin composition (nonvolatile content: 40% by mass; anionic group (carboxyl group; this applies to the followings) concentration: 0.17 mmol/g).

<Production of a Synthetic Leather>

A blend liquid comprising 100 parts by mass of an aqueous urethane resin composition for skin layer ("HYDRAN WLS-210", manufactured by DIC Corporation), 10 parts by mass of a water-dispersible black pigment ("Dailack HS-9530", manufactured by DIC Corporation), and 1 part by mass of an association-type thickener ("HYDRAN Assister T10", manufactured by DIC Corporation) was applied to flat release paper ("DN-TP-155T", manufactured by Ajinomoto Co., Inc.) so that the thickness of the dried film became 30 μm, and dried at 70° C. for 2 minutes and further at 120° C. for 2 minutes. Then, a blend liquid comprising 100 parts by mass of the aqueous urethane resin composition obtained in the above preparation example, 1 part by mass of an association-type thickener ("HYDRAN Assister T10", manufactured by DIC Corporation), and 9 parts by mass of a polyisocyanate crosslinking agent ("HYDRAN Assister C5", manufactured by DIC Corporation) was applied so that the thickness of the dried film became 50 μm, and dried at 70° C. for 3 minutes. Immediately after being dried, T/R raised fabric was put on the resultant film, and then subjected to heat treatment at 120° C. for 2 minutes, and subjected to aging at 50° C. for 2 days, and the release paper was removed to obtain a synthetic leather.

Example 2

Into a four-neck flask equipped with a stirrer, a reflux condenser, a thermometer, and a nitrogen gas introducing pipe were charged 500 parts by mass of polycarbonate diol ("DURANOL T5652", manufactured by Asahi Kasei Chemicals Corporation; number average molecular weight: 2,000; hereinafter, abbreviated to "PC"), 8 parts by mass of DMPA, and 394 parts by mass of methyl ethyl ketone under a nitrogen gas flow, and they were uniformly mixed with each other, and then 68 parts by mass of TDI was added, and then 0.1 parts by mass of dibutyltin dilaurate was added and the resultant mixture was subjected to reaction at 70° C. for about 4 hours. Subsequently, 14 parts by mass of 1,3-BG was added and the resultant mixture was subjected to reaction at 70° C. for about one hour so as to complete the reaction, obtaining a methyl ethyl ketone solution of a urethane polymer. Then, 6 parts by mass of triethylamine was added to the methyl ethyl ketone solution of the urethane polymer obtained by the above-mentioned method to neutralize the carboxyl group in the urethane polymer, and then 886 parts by mass of ion-exchanged water was added and then methyl ethyl ketone was distilled off under a reduced pressure to obtain an aqueous urethane resin composition (nonvolatile content: 40% by mass; anionic group concentration: 0.11 mmol/g). Using this resin composition, a synthetic leather was obtained in the same manner as in Example 1.

Example 3

Into a four-neck flask equipped with a stirrer, a reflux condenser, a thermometer, and a nitrogen gas introducing pipe were charged 500 parts by mass of polypropylene glycol (number average molecular weight: 2,000; hereinafter, abbreviated to "PPG2000"), 9 parts by mass of 1,4-butanediol (hereinafter, abbreviated to "1,4-BG"), 10 parts by mass of DMPA, and 400 parts by mass of methyl ethyl ketone under a nitrogen gas flow, and they were uniformly mixed with each other, and then 78 parts by mass of TDI was added, and then 0.1 parts by mass of dibutyltin dilaurate was added and the resultant mixture was subjected to reaction at 70° C. for about 4 hours. Subsequently, 4 parts by mass of 1,3-BG was added and the resultant mixture was subjected to reaction at 70° C. for about one hour so as to complete the reaction, obtaining a methyl ethyl ketone solution of a urethane polymer. Then, 7 parts by mass of N,N-dimethylethanolamine was added to the methyl ethyl ketone solution of the urethane polymer obtained by the above-mentioned method to neutralize the carboxyl group in the urethane polymer, and then 901 parts by mass of ion-exchanged water was added and then methyl ethyl ketone was distilled off under a reduced pressure to obtain an aqueous urethane resin composition (nonvolatile content: 40% by mass; anionic group concentration: 0.13 mmol/g). Using this resin composition, a synthetic leather was obtained in the same manner as in Example 1.

Example 4

Into a four-neck flask equipped with a stirrer, a reflux condenser, a thermometer, and a nitrogen gas introducing pipe were charged 500 parts by mass of polytetramethylene glycol (number average molecular weight: 2,000; hereinafter, abbreviated to "PTMG2000"), 3 parts by mass of ethylene glycol (hereinafter, abbreviated to "EG"), 12 parts by mass of DMPA, and 403 parts by mass of methyl ethyl ketone under a nitrogen gas flow, and they were uniformly mixed with each other, and then 79 parts by mass of TDI was added, and then 0.1 parts by mass of dibutyltin dilaurate was added and the resultant mixture was subjected to reaction at 70° C. for about 4 hours. Subsequently, 11 parts by mass of 1,3-BG was added and the resultant mixture was subjected to reaction at 70° C. for about one hour so as to complete the reaction, obtaining a methyl ethyl ketone solution of a urethane polymer. Then, 9 parts by mass of triethylamine was added to the methyl ethyl ketone solution of the urethane polymer obtained by the above-mentioned method to neutralize the carboxyl group in the urethane polymer, and then 907 parts by mass of ion-exchanged water was added and then methyl ethyl ketone was distilled off under a reduced pressure to obtain an aqueous urethane resin composition (nonvolatile content: 40% by mass; anionic group concentration: 0.15 mmol/g). Using this resin composition, a synthetic leather was obtained in the same manner as in Example 1.

Example 5

Into a four-neck flask equipped with a stirrer, a reflux condenser, a thermometer, and a nitrogen gas introducing pipe were charged 500 parts by mass of PTMG2000, 50 parts by mass of polyester polyol (reaction product of 1,4-butanediol and adipic acid; number average molecular weight: 1,000; hereinafter, abbreviated to "PEs"), 0.2 parts by mass of trimethylolpropane (hereinafter, abbreviated to "TMP"), 10 parts by mass of DPMA, and 435 parts by mass of methyl ethyl ketone under a nitrogen gas flow, and they were uniformly mixed with each other, and then 79 parts by mass of TDI was added, and then 0.1 parts by mass of dibutyltin dilaurate was added and the resultant mixture was subjected to reaction at 70° C. for about 4 hours. Subsequently, 14 parts by mass of 1,3-BG was added and the resultant mixture was subjected to reaction at 70° C. for about one hour so as to complete the reaction, obtaining a methyl ethyl ketone solution of a urethane polymer. Then, 7 parts by mass of N,N-dimethylethanolamine was added to the methyl ethyl ketone solution of the urethane polymer obtained by the above-mentioned method to neutralize the carboxyl group in the urethane polymer, and then 979 parts by mass of ion-exchanged water was added and then methyl ethyl ketone was distilled off under a reduced pressure to obtain an aqueous urethane resin composition (nonvolatile content: 40% by mass; anionic group concentration: 0.12 mmol/g). Using this resin composition, a synthetic leather was obtained in the same manner as in Example 1.

Example 6

Into a four-neck flask equipped with a stirrer, a reflux condenser, a thermometer, and a nitrogen gas introducing pipe were charged 500 parts by mass of polypropylene glycol (number average molecular weight: 1,000; hereinafter, abbreviated to "PPG1000"), 18 parts by mass of DMPA, and 472 parts by mass of methyl ethyl ketone under a nitrogen gas flow, and they were uniformly mixed with each other, and then 115 parts by mass of TDI and 41 parts by mass of 4,4'-diphenylmethane diisocyanate (hereinafter, abbreviated to "MDI") were added, and then 0.1 parts by mass of dibutyltin dilaurate was added and the resultant mixture was subjected to reaction at 70° C. for about 4 hours. Subsequently, 34 parts by mass of 1,3-butanediol was added and the resultant mixture was subjected to reaction at 70° C. for about one hour so as to complete the reaction, obtaining a methyl ethyl ketone solution of a urethane polymer. Then, 14 parts by mass of triethylamine was added to the methyl ethyl ketone solution of the urethane polymer obtained by the above-mentioned method to neutralize the carboxyl group in the urethane polymer, and then 1,063 parts by mass of ion-exchanged water was added and then methyl ethyl ketone was distilled off under a reduced pressure to obtain an aqueous urethane resin composition (nonvolatile content: 40% by mass; anionic group concentration: 0.19 mmol/g). Using this resin composition, a synthetic leather was obtained in the same manner as in Example 1.

Comparative Example 1

Into a four-neck flask equipped with a stirrer, a reflux condenser, a thermometer, and a nitrogen gas introducing pipe were charged 500 parts by mass of PTMG1000, 15 parts by mass of DMPA, and 450 parts by mass of methyl ethyl ketone under a nitrogen gas flow, and they were uniformly mixed with each other, and then 149 parts by mass of isophorone diisocyanate (hereinafter, abbreviated to "IPDI") was added, and then 0.1 parts by mass of dibutyltin dilaurate was added and the resultant mixture was subjected to reaction at 70° C. for about 4 hours. Subsequently, 11 parts by mass of 1,3-BG was added and the resultant mixture was subjected to reaction at 70° C. for about one hour so as to complete the reaction, obtaining a methyl ethyl ketone solution of a urethane polymer. Then, 10 parts by mass of N,N-dimethylethanolamine was added to the methyl ethyl ketone solution of the urethane polymer obtained by the above-mentioned method to neutralize the carboxyl group in the urethane polymer, and then 1,012 parts by mass of ion-exchanged water was added and then methyl ethyl ketone was distilled off under a reduced pressure to obtain an aqueous urethane resin composition (nonvolatile content: 40% by mass; anionic group concentration: 0.16 mmol/g). Using this resin composition, a synthetic leather was obtained in the same manner as in Example 1.

Comparative Example 2

Into a four-neck flask equipped with a stirrer, a reflux condenser, a thermometer, and a nitrogen gas introducing pipe were charged 500 parts by mass of PTMG1000, 34 parts by mass of DMPA, and 460 parts by mass of methyl ethyl ketone under a nitrogen gas flow, and they were uniformly mixed with each other, and then 144 parts by mass of TDI was added, and then 0.1 parts by mass of dibutyltin dilaurate was added and the resultant mixture was subjected to reaction at 70° C. for about 4 hours. Subsequently, 14 parts by mass of 1,3-BG was added and the resultant mixture was subjected to reaction at 70° C. for about one hour so as to complete the reaction, obtaining a methyl ethyl ketone solution of a urethane polymer. Then, 22 parts by mass of N,N-dimethylethanolamine was added to the methyl ethyl ketone solution of the urethane polymer obtained by the above-mentioned method to neutralize the carboxyl group in the urethane polymer, and then 1,036 parts by mass of ion-exchanged water was added and then methyl ethyl ketone was distilled off under a reduced pressure to obtain an aqueous urethane resin composition (nonvolatile content: 40% by mass; anionic group concentration: 0.36 mmol/g). Using this resin composition, a synthetic leather was obtained in the same manner as in Example 1.

[Method for Measuring a Number Average Molecular Weight]

The number average molecular weight of the polyol and the like used in the Examples and Comparative Examples indicates a value obtained by conducting the measurement by a gel permeation column chromatography (GPC) method under the conditions shown below.

Measuring apparatus: High-speed GPC apparatus ("HLC-8220GPC", manufactured by Tosoh Corp.)

Columns: The columns shown below, manufactured by Tosoh Corp., which are connected in series were used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (differential refractometer)
Column temperature: 40° C.
Eluent: Tetrahydrofuran (THF)
Flow rate: 1.0 mL/minute
Sample amount per injection: 100 μL (tetrahydrofuran solution having a sample concentration of 0.4% by mass)
Standard sample: A calibration curve was prepared using the standard polystyrenes shown below.

(Standard Polystyrenes)
"TSKgel standard polystyrene A-500", manufactured by Tosoh Corp.
"TSKgel standard polystyrene A-1000", manufactured by Tosoh Corp.
"TSKgel standard polystyrene A-2500", manufactured by Tosoh Corp.
"TSKgel standard polystyrene A-5000", manufactured by Tosoh Corp.
"TSKgel standard polystyrene F-1", manufactured by Tosoh Corp.
"TSKgel standard polystyrene F-2", manufactured by Tosoh Corp.
"TSKgel standard polystyrene F-4", manufactured by Tosoh Corp.
"TSKgel standard polystyrene F-10", manufactured by Tosoh Corp.

"TSKgel standard polystyrene F-20", manufactured by Tosoh Corp.
"TSKgel standard polystyrene F-40", manufactured by Tosoh Corp.
"TSKgel standard polystyrene F-80", manufactured by Tosoh Corp.
"TSKgel standard polystyrene F-128", manufactured by Tosoh Corp.
"TSKgel standard polystyrene F-288", manufactured by Tosoh Corp.
"TSKgel standard polystyrene F-550", manufactured by Tosoh Corp.

[Method for Measuring a Peel Strength]

With respect to the synthetic leathers obtained in the Examples and Comparative Examples, a peel strength was measured using Shimadzu Autograph "AG-1" (manufactured by Shimadzu Corporation) under conditions at a full scale of 5 kg and at a head speed of 20 mm/minute, and evaluated according to the following criteria.
"A": 0.15 MPa or more
"B": 0.1 to less than 0.15 MPa
"C": Less than 0.1 MPa

[Evaluation Method for Hydrolytic Resistance]

The synthetic leathers obtained in the Examples and Comparative Examples were individually allowed to stand under conditions at 70° C. and at a humidity of 95% for 5 weeks. Then, a peel strength of the resultant synthetic leather was measured by the same method as in [Method for measuring a peel strength] above, and a peel strength maintaining ratio between the synthetic leather after allowed to stand and that before allowed to stand was calculated, and evaluated according to the following criteria.
"A": 70% or more
"B": 50 to less than 70%
"C": Less than 50%

[Evaluation Method for Light Resistance]

The synthetic leathers obtained in the Examples and Comparative Examples were individually irradiated with a light for 100 hours using Fadeometer "U48AU", manufactured by Suga Test Instruments Co., Ltd. (63° C.; humidity: 50%). The resultant synthetic leather was visually examined, and evaluated according to the following criteria.
"A": No change is found in the appearance.
"B": Slight yellowing is found in the appearance.
"C": Marked yellowing is found in the appearance.

TABLE 1

| | | Example 1 | Example 2 | Example 3 | Example 4 |
|---|---|---|---|---|---|
| Urethane resin (A) | Polyols (a1) | | | | |
| | Anionic group-containing Polyol (a-1) | DMPA | DMPA | DMPA | DMPA |
| | Other polyol | PTMG1000 | PC | PPG2000 | PTMG2000 |
| | Aromatic polyisocyanate (a2) | TDI | TDI | TDI | TDI |
| | Chain extender | | | 1,4-BG | EG |
| | Anionic group concentration (mmol/g) | 0.17 | 0.11 | 0.13 | 0.15 |
| | Aromatic ring concentration (mol/kg) | 1.05 | 0.67 | 0.74 | 0.75 |
| | Weight average molecular weight | 55,000 | 29,000 | 68,000 | 46,000 |
| Evaluation of peel strength | | A | A | A | A |
| Evaluation of hydrolytic resistance | | A | A | A | A |
| Evaluation of light resistance | | A | A | A | A |

TABLE 2

| | | Example 5 | Example 6 | Comparative Example 1 | Comparative Example 2 |
|---|---|---|---|---|---|
| Urethane resin (A) | Polyols (a1) | | | | |
| | Anionic group-containing polyol (a-1) | DMPA | DMPA | DMPA | DMPA |
| | Other polyol | PTMG2000 PEs | PPG1000 | PTMG1000 | PTMG1000 |
| | Aromatic polyisocyanate (a2) | TDI | TDI MDI | | TDI |
| | Other polyisocyanate | | | IPDI | |
| | Chain extender | TMP | | | |
| | Anionic group concentration (mmol/g) | 0.12 | 0.19 | 0.16 | 0.36 |
| | Aromatic ring concentration (mol/kg) | 0.49 | 1.46 | 0 | 1.21 |
| | Weight average molecular weight | 38,000 | 18,000 | 54,000 | 43,000 |
| Evaluation of peel strength | | A | A | C | A |
| Evaluation of hydrolytic resistance | | B | A | A | C |
| Evaluation of light resistance | | A | A | A | A |

It was found that Examples 1 to 6, which correspond to the synthetic leather using the aqueous urethane resin composition of the invention, had excellent peel strength, hydrolytic resistance, and light resistance.

On the other hand, in Comparative Example 1, which corresponds to an embodiment in which an alicyclic polyisocyanate was used instead of the aromatic polyisocyanate (a2), the peel strength was poor.

In Comparative Example 2, which corresponds to an embodiment in which the anionic group concentration of the urethane resin (A) is outside of the range defined in the invention, the hydrolytic resistance was poor.

The invention claimed is:

1. A synthetic leather comprising a laminate comprising at least a base fabric (i), a bonding layer (ii), and a skin layer (iii),
   wherein the bonding layer (ii) is made from an aqueous urethane resin composition comprising a urethane resin (A); and an aqueous medium (B),
   wherein the urethane resin (A) is a reaction product of a polyol (a1) comprising an anionic group-containing polyol (a1-1) and an aromatic polyisocyanate (a2),
   wherein the urethane resin (A) has an anionic group concentration of 0.11 mmol/g or more and 0.35 mmol/g or less,
   wherein the polyol (a1) further comprises polyether polyol,
   wherein a content of the anionic group-containing polyol (a1-1) in the polyol (a1) is in a range of 1.57 to 3% by mass,
   wherein the aromatic polyisocyanate (a2) comprises toluene diisocyanate,
   wherein the urethane resin (A) further comprises, as a raw material, a chain extender having a hydroxyl group including 1,3-butanediol, and
   wherein a weight average molecular weight of the urethane resin (A) is in a range of 13,000 to 70,000.

2. The synthetic leather according to claim 1, wherein the urethane resin (A) has an aromatic ring concentration in the range of 0.1 to 2.5 mol/kg.

3. The synthetic leather according to claim 1, wherein the polyol (a1) further comprises at least one of polyester polyol, acrylic polyol, and polybutadiene polyol.

4. The synthetic leather according to claim 1, wherein the anionic group concentration is 0.11 mmol/g or more and 0.22 mmol/g or less.

5. The synthetic leather according to claim 1, wherein the urethane resin (A) has an aromatic ring concentration in the range of 0.1 to 0.75 mol/kg.

* * * * *